United States Patent Office 3,439,425
Patented Apr. 22, 1969

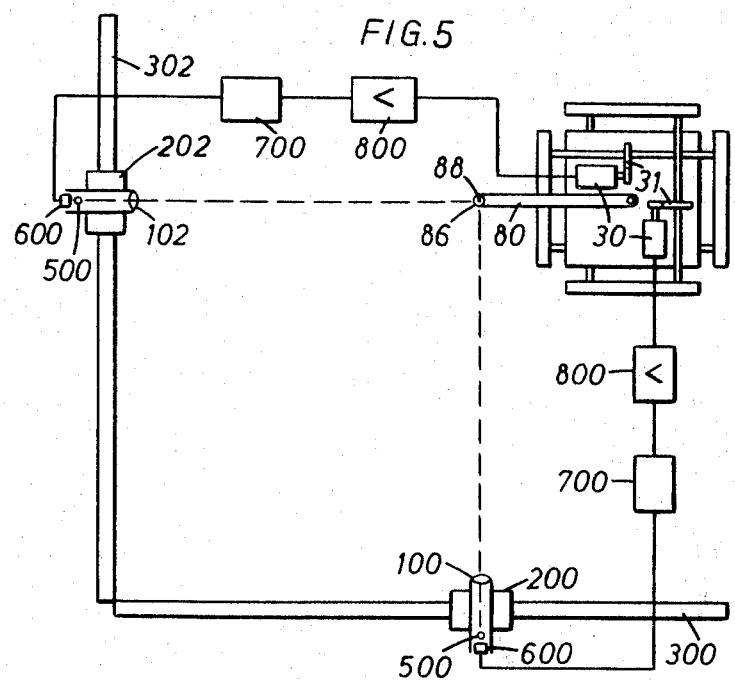
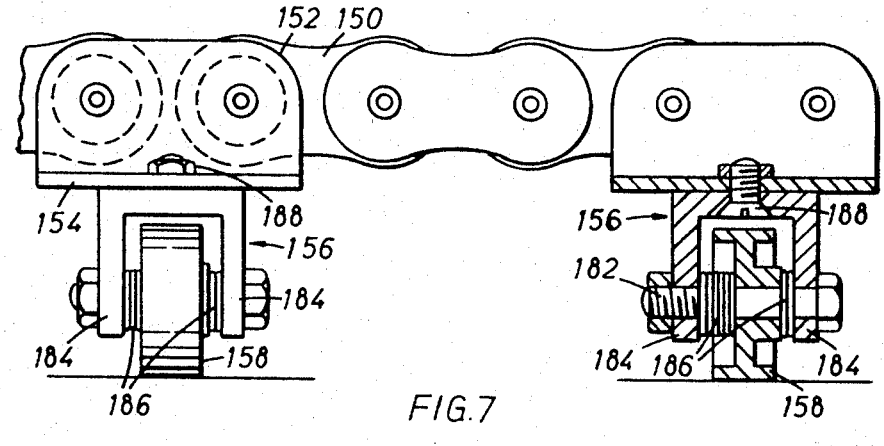

3,439,425
SELF-LAYING ENDLESS TRACKS AND TRANSPORTERS FITTED THEREWITH
Brian C. Doxey, Welwyn, and Robert E. Miller, Hatfield, England, assignors to The British Oxygen Company Limited, a British company
Filed Apr. 10, 1967, Ser. No. 629,650
Claims priority, application Great Britain, Apr. 19, 1966, 17,116/66
Int. Cl. B43l 13/10; B62d 55/08, 55/00
U.S. Cl. 33—23                           9 Claims

ABSTRACT OF THE DISCLOSURE

A tractor for transporting articles, for example a flame cutting torch, over a surface upon which the tractor runs, has two pairs of endless tracks, one pair being at right angles to the other pair. Each track carries rollers or the like whose axes of rotation are parallel to the direction of movement of the associated endless track. This permits omnidirectional movement of the tractor in the plane of the surface. A system of guidance and a construction of track link and of an endless track are also disclosed.

---

This invention relates to apparatus for transporting an article or articles in a controlled manner in any desired direction over a surface upon which the apparatus runs.

A specific and nonlimiting application of the invention is to apparatus for transporting a tool for acting on a workpiece, for example a flame-cutting torch, over the surface of the workpiece. For the purpose of simplicity of description, flame cutting of profiles will be referred to in the specific description hereinafter, but it will be appreciated that the invention is not so limited and is capable of many other applications, for example: in transporting intense sources of gamma-rays or other harmful radiation over the surface of a body to be tested or treated by the use of such radiation; in mechanical handling generally; in stacking, selecting or loading articles in warehouses or stores; in filling and blending applications; in applying or cutting designs or patterns to or on carpets or textiles or other surfaces of considerable area; in certain domestic and personal applications; in instrumentation and manipulation applications particularly for remote-controlled handling and in various aviation, military and agricultural applications.

Existing methods of flame cutting profiles in large metal plates (40′ x 12′ say) use machines which are large, expensive and occupy large areas of floor space which cannot be used for other purposes when the machine is not in use.

If a requirement arose to cut profiles from plates larger than 40′ x 12′ then the machinery required to control the flame cutter would be even larger and still more expensive. Furthermore, the purpose of the elaborate machinery is to carry a small flame cutter weighing only a few pounds and to control it to follow the correct path. It is therefore an aim of the present invention to provide relatively simple and versatile apparatus which when under remote control can transport a tool or article in a controlled manner over a surface. This can be achieved by a relatively small tractor carrying the tool or article, e.g., a cutting torch. The tractor runs in use over the surface, i.e., the plate to be profiled and is suitably controlled to cut out any desired shape as it progresses over the plate. Using this technique of cutting there is less limitation in the size of plate than using the elaborate machines discussed above.

In this specification, the terms identified below shall have the following meanings: self-laying endless track means and endless chains, flexible belt or cable adapted to pass around and to be driven by one or more driving elements such as a sprocket in the case of a chain, a roller in the case of a belt, or a grooved wheel or pulley in the case of a cable; a track link means a link forming part of an endless chain and being adapted to engage and to be driven by the aforesaid driving element; a surface bearing element means a roller, wheel or ball capable of being secured to the self-laying endless track and of being mounted for rotation about an axis fixed with respect to the track.

The invention provides a track link for a self-laying endless track, said track link having mounted thereon a surface bearing element rotatable about a fixed axis parallel to the direction of movement of the track.

The invention also provides a self-laying endless track utilizing such track links and a transporter employing at least two such self-laying endless tracks.

The invention further provides a self-laying endless track carrying surface bearing elements spaced uniformly apart throughout its length, each said surface bearing element being rotatable about a fixed axis parallel to the direction of movement of the track.

According to a preferred embodiment of the invention, there is provided a transporter comprising a tractor which has tracks such that it is capable of independent movement over a surface along two perpendicular (X, Y) axes. In use, signals are fed into the tractor causing it to move along any prescribed path contained by the X, Y axes. Further practical requirements of the flame-cutting specific embodiment of the invention are that the tractor shall be capable of traversing the type of surface on a steel plate as brought in from the rolling mills and that it shall be able to run over the kerf left by the flame cutter that it carries.

It will be seen that a transporter as discussed above is capable of omnidirectional movement in a plane when the tracks are appropriately driven.

In a preferred embodiment of the invention the tractor is square or rectangular with four main tracks one on each side of the square or rectangle, each of these tracks carrying rollers or the like whose axes are all parallel to each other and perpendicular to the direction of movement of the track. With this form of tracked vehicle the weight is distributed over a relatively large area.

Illustrative embodiments of the invention will now be particularly described, the description being given with reference to the accompanying drawings in which:

FIG. 5 is a diagrammatic plan view broadly corresponding to FIG. 2 but including further elements of the guidance and control system;

FIG. 7 is a detail view of track links of the track shown in FIG. 6, one being shown in elevation and one in section;

Figure 1:
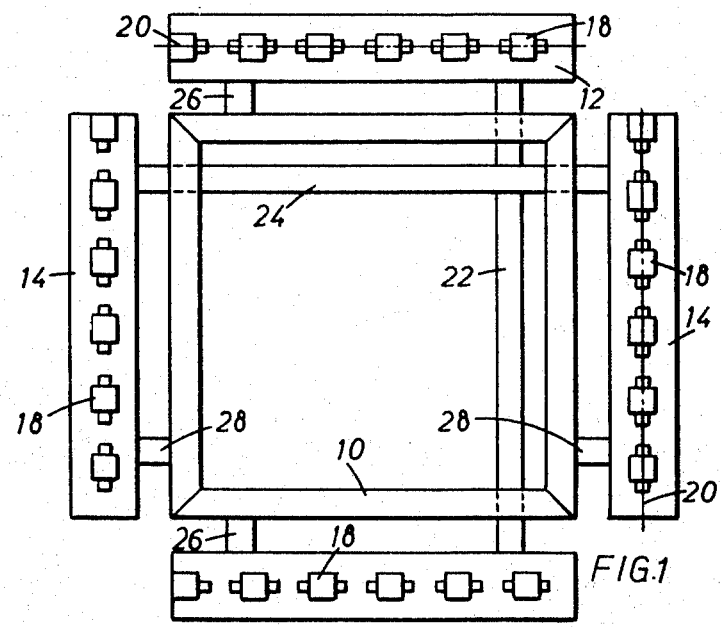
FIG. 1 is a diagrammatic plan view of one form of apparatus in accordance with the invention.

Referring firstly to FIG. 1, it will be seen that the tractor body 10 takes the form of a square with four main tracks 12 and 14 mounted along each of the four sides of the square such that a pair (14) of opposite tracks give movement in the Y direction and a second pair (12) give movement in the X direction. In order that each of the four tracks may move in a lateral direction a series of rollers 18 are fixed to each track with the roller axis 20 parallel to the length of the track. This allows the track to roll in a direction perpendicular to the direction in which it is normally driven. It will therefore be appreciated that if each of the four tracks is fitted with a set of transverse rollers, then if for instance the Y tracks are driven normally with the X tracks stationary (in the X direction) then the rollers mounted in the X track will roll in the Y direction. Correspondingly, the behaviour is similar if the X tracks are driven and the Y tracks are stationary. This configuration therefore allows independent movement in the X and Y directions and furthermore if X and Y tracks are both driven at the same time the tractor will move in a direction and at a speed depending upon the individual speeds of the X and Y tracks. Such a tractor is capable of moving in any direction in the X–Y plane and the direction and speed may be changed by simple adjustment of the X and Y track speeds.

The tracks 12 and 14 are driven by shafts 22 and 24, and pass round idler sprockets (not shown) running on shafts 26 and 28 at their opposite ends. The shafts 22 and 24 are driven by electric or other suitable motors (30 in FIG. 5) and in use a wander cable suspended from a convenient boom or girder above the surface carrying the tractor brings power to the motors and the necessary gases for flame cutting. Such a cable would of course bring other services or consumables as may be required in accordance with the operation being performed by the tractor.

As an alternative for flame cutting, the tractor body 10 may carry its own supplies of oxygen and fuel gas in gas cylinder or other containers. These gases may be stored in the liquefied state both to reduce their bulk and to enable cooling of the tractor, torch or other tool to be obtained during use.

The tool (not shown in FIG. 1), e.g., a flame or plasma cutting torch is advantageously carried at the centre of the body 10, which may have an aperture to accommodate it, but it may alternatively be carried by a cantilever boom secured to the body and extending out over the past one of the tracks 12 or 14 so that the outer tool-carrying end of the arm is located over the workpiece.

Figure 3:
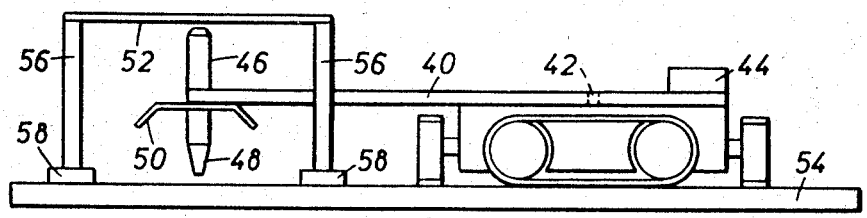
FIG. 3 is a side elevation view of a tractor including rotatable boom employed for flame-cutting by line-following a drawing.
Figure 4:
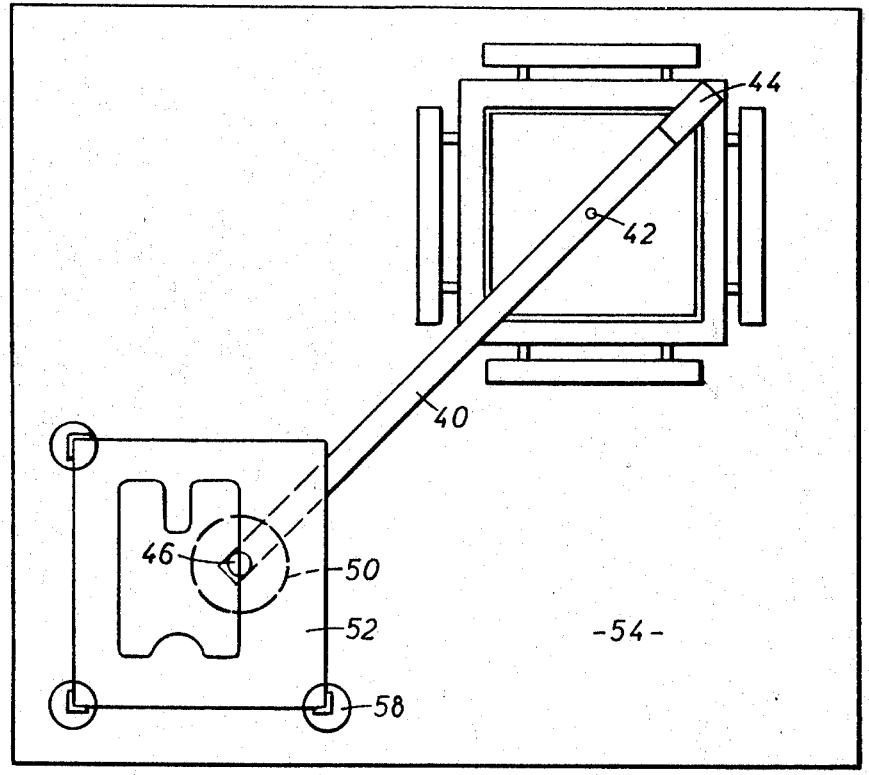
FIG. 4 is a plan view corresponding to FIG. 3.

In this latter embodiment of the invention, one form of which is illustrated in FIGS. 3 and 4, the provision of the rotatable boom 40 allows the cut made in use by a cutting torch to extend to the edge of the plate or other workpiece being cut, without the need to provide a surround on which the tractor or part of it can run when it is near the plate edge. The rotation of the boom may be effected by an electric motor energised by commands supplied from magnetic tape, or derived from the carriages guiding the tractor, from a plotting table, remotely by an operator, or by other suitable means. It may take place continuously with the travel of the cutter around the profile or in discrete steps. The tractor system employing a rotating boom could be used if necessary to prevent the tractor running over certain parts of the plate.

It is necessary that the rotary movement of the boom does not interfere with normal guidance and movement of the cutter. If the velocity of the cutter due to rotation of the boom is slow relative to the cutting speed, the tractor has only to move at a slightly increased or decreased speed in each of the X and Y axes. Since the tractor when used with the system of FIG. 5, which will shortly be described, receives commands to move according to the sensed position of the lamp, the tractor will move to compensate for the rotation of the boom. There will, however be a slight positional error due to the velocity of the rotational boom and if necessary signals may be fed to the tractor motors to compensate for this. If it is necessary, owing to the construction of the lamp and guidance system, the lamp and/or cutter may be rotated relative to the boom to maintain a fixed orientation with respect to the tractor.

Rotation of the boom is preferably carried out using an electric motor (not shown) driving through a gearbox (also not shown). As illustrated in FIGS. 3 and 4 the boom is mounted on a pivot 42 at the centre of the tractor, and counter balanced by a weight 44 to prevent fluctuation in load on the suspension of the tractor.

The track links and self-laying endless tracks will now be described with reference to FIGS. 6 to 8. The track 12 comprises a standard form of roller chain similar to the type used on motor cycles having inner links 150 and outer links 152. The side plates 154 of the outer links are bent outwardly at a right-angle and carry secured to them channel-section members 156, FIG. 6. Each channel section member 156 carries two rollers 158, one on either side of the centre line of the chain for reasons of stability and weight distribution.

Since the tractor has four powered tracks 12, 14 it is necessary to ensure that the total weight is fairly well distributed between each of the four tracks otherwise a lightly loaded track may tend to slip and cause rotation of the tractor body 10. Each track is therefore fitted with its own spring loaded suspension to ensure that the rollers (18 or 158) are pressed down firmly in contact with the running surface.

Figure 8:
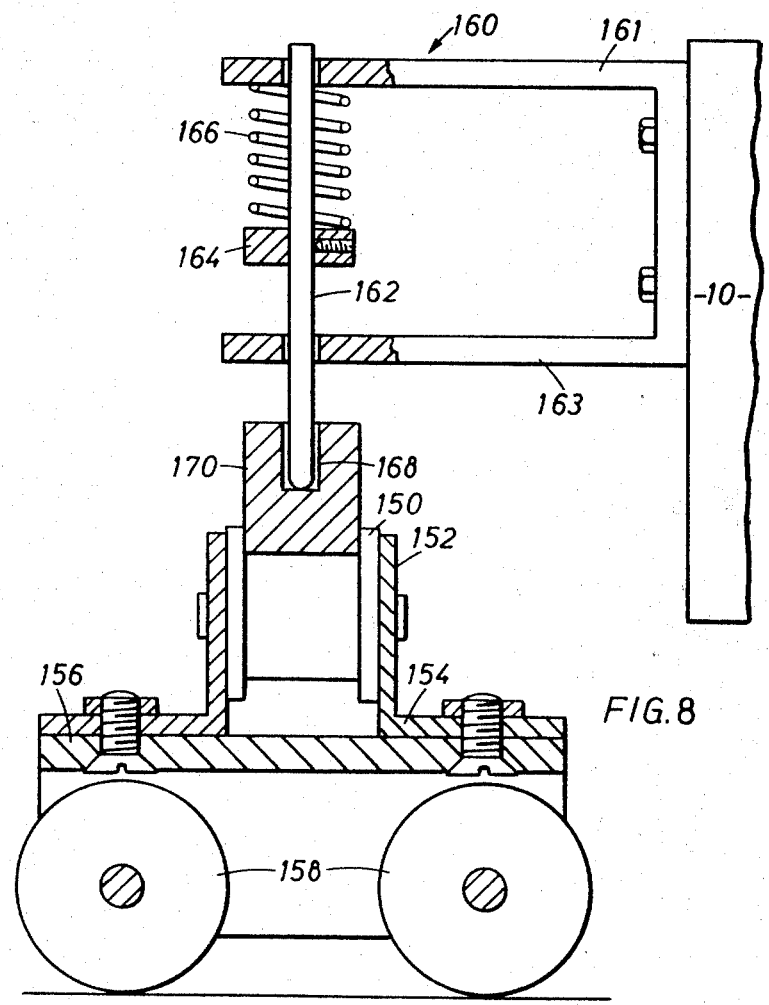
FIG. 8 is a cross-section taken perpendicular to the direction of movement of the track showing one form of track suspension.

FIG. 8 shows details of this suspension which comprises a channel bracket 160 secured to the tractor body 10 and having two pairs, or alternatively a series, of opposed apertures in its two flanges 161 and 163. Each pair of opposed apertures receives and guides a suspension rod 162 having a collar 164 fixed thereto. Mounted between the collar 164 and the inner flange 161 is a compression spring 166. The end of the rod projecting beyond the outer flange 163 engages in a pocket 168 in a roller supporting bar 170. A similar pocket in the bar is provided for each rod. The bar is located partly between the side plates of the roller chain and engages the rollers of the chain so that the tractor weight is transmitted down through springs, collars, rods, and the bar through the chain and onto the rollers 158.

Longitudinal movement of the bar 170 is prevented by the rods 162 which have their lower ends extending into the pockets in the bar.

The suspension arrangements on the remaining three tracks are exactly similar to the one described above.

An arrangement adopting a similar principle but inverted compared to that described above can be employed to tension the upper run of the track by urging it upwardly and thus eliminate substantially all slackness or backlash in the track.

Each track may have a similar suspension and a similar backlash-eliminating arrangement.

Figure 6:
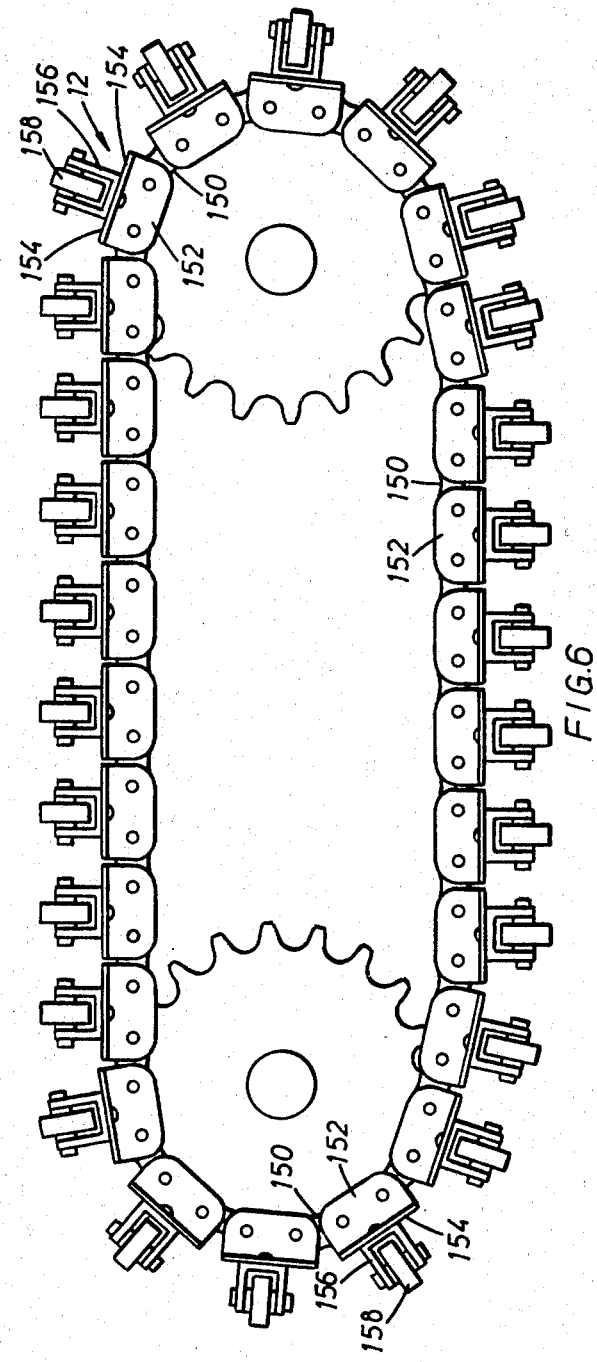
FIG. 6 is a general side elevation view of a track of the tractor.

Referring now to FIGS. 6 and 7, the channel section members 156 each carry a pair of rollers 158, these rollers being mounted on bolts 182 serving as shafts and spaced from the flanges 184 of the members 156 by washers 186. Each member 156 is fixed to its associated side plate 154 by a nut and bolt assembly 188, although other fixing means could of course be used.

Figure 9:
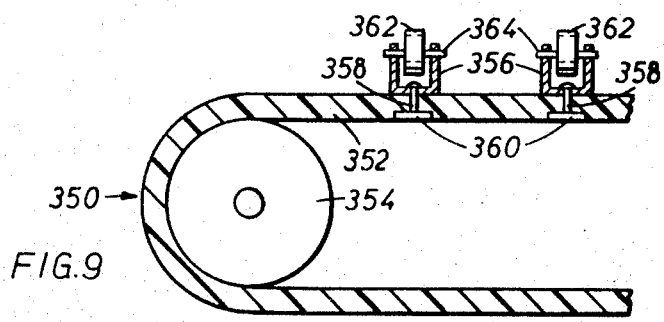
FIG. 9 is a schematic vertical section through an embodiment of the invention in which the self-laying endless track comprises a flexible belt carrying rollers and extending around a pair of drums.

FIGURE 9 illustrates an alternative embodiment of the invention in which the self-laying endless track (generally indicated by reference numeral 350) comprises an endless flexible belt 352 of rubber or other material of suitable characteristics passing around a driving drum 354 and an idler drum (not shown). The drums are illustrated as plain cylinders but they could equally well be cylindrical with a wide shallow groove, that is to say in the form of wide pulleys.

The belt 352 carries a plurality of brackets 356, only two being shown, each generally channel-shaped in section which extend with the channel length transverse to the longitudinal direction of the belt. These brackets are secured to the belt by rivets 358 cooperating with backing plates 360 inset into the belt. Other suitable securing means may of course be used so long as they permit the endless belt 352 to pass around the drum 354 and the idler drum. Each bracket 356 carries a freely-rotatable roller 362 mounted on a shaft 364. The shaft 364 is parallel to the direction of movement of the belt 352. If desired, more than one roller may be carried by each bracket, and balls or other suitable rotatable elements may replace the rollers.

Figure 2:
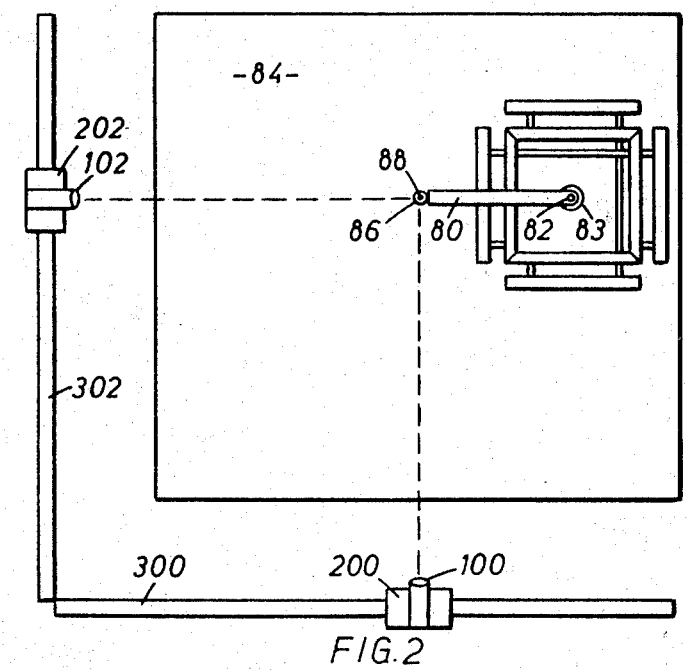
FIG. 2 is a diagrammatic plan view showing a slightly modified form of apparatus including a rotatable boom and some of the elements of a guidance and control system.

FIG. 2 shows a tractor carrying a rotatable beam 80 rotatable about a vertical pivot pin 82 secured to the tractor body. The boom 80 is driven to rotate by an electric motor 83 carried by the tractor body. The tractor (which is similar to that previously described) runs on a plate 84. The distal end of the boom carries a flame cutting nozzle or other tool and mounted directly above the centre thereof is a lamp 86 having a vertical filament 88.

The system for guidance and control of the tractor involves monitoring the tractor position by telescopes 100, 102 which are focused on to the lamp 86 carried by the tractor. This system is illustrated in FIGS. 2 and 5 which show two telescopes 100, 102 mounted on motorised carriages 200, 202 running on a pair of perpendicular guides or rails 300, 302 which may be regarded as the X and Y axes of the system. The carriages carrying the telescopes are powered by electric servomotors which are fed with information defining the coordinates of each and every point on the profile to be traced out. This information may be fed from magnetic tape or a plotting table in the form of voltage which represent the coordinates of points on the profile. The actual position of the telescope axes from the origin or intersection of the two rails 300, 302 may be measured by conventional machine tool methods, e.g., potentiometers, synchros, or optical gratings depending upon the accuracy required. The positional information thus derived is fed back and compared with the demanded position so that the appropriate corrections can be made to make the two equal. The carriages and telescopes thus move in sympathy with the X and Y coordinates required and form the profile and the intersection of the two telescope axes which are mounted at right angles to their respective rails define every point on the profile.

Referring to FIG. 5 it will be seen that as long as the cutter carried by the tractor remains at the intersection of the two telescope axes then the desired profile will be traced out. In order to satisfy this condition the tractor is provided with a lamp 86 which has a straight filament 88 mounted in a vertical position directly over the centre of the cutting nozzle. The telescopes 100, 102 are focused onto this lamp and the image of the lamp as seen by the telescope is scanned by a photo electric cell 500 mounted at the end of a vibrating piezoelectric rod 600 (see U.K. patent specification No. 1,014,975). When the image of the lamp is at the centre of the scan, i.e., when the lamp is directly on the telescope axis, the photocell 500 produces a voltage at double the scan frequency. However if the lamp moves off the telescope axis then the image moves and the photocell output contains a component of voltage at the scan frequency. The phase of this fundamental component changes through 180° when the image position changes from one side of the centre line to the other. The photocell output is fed into a filter 700 which removes the double frequency components from the photocell output and allows the fundamental component to pass through. This is then amplified by amplifier 800 and the resulting voltage is fed to one of two two-phase servo motors 30 which drive the appropriate pair of tracks on the tractor through gearing 31 so that the tractor and lamp tend to move towards the telescope axis.

The control system will have fewer corrections to make if the X and Y tracks of the tractor are arranged parallel to the respective X and Y rails. However if misalignment does occur it is evident that movement in say the X direction will create an error in the Y direction and vice versa. This error is immediately detected by the telescope and the necessary signal is applied to the tractor motors to cancel out the error. In practice it has been found that quite large misalignments for example over 30° can be corrected for but for angles larger than this it may be necessary to realign the tractor tracks with their respective rails.

The transporter may be employed in profile following and this will now be described.

As illustrated in FIGS. 3 and 4 the boom carries at its distal end a line following head 46 of any type well known in the metal profile cutting art and a cutting nozzle 48. A heat shield 50 is secured to the nozzle 48. A table having a "Perspex" or other transparent flat surface 52 is supported on the plate 54 to be cut by legs 56 the lower ends of which have or are attached to magnetic clamps 58 by which the table is fixed to the plate 54.

In use the signals from the line following head as it follows a drawing placed on the table 52 are fed to the X and Y motors of the tractor which then moves to follow the profile of the drawing. As is does so the torch 48 carried at the distal end of the nozzle cuts the desired profile in the plate. The boom 40 is maintained fixed relative to the tractor when operating in accordance with this system.

In an alternative embodiment of the invention, not illustrated, a cutting torch is mounted on the tractor, preferably at the centre thereof, and an optical line-following head is mounted directly above the torch. The optical head views the image of a profile to be followed which is arranged to appear on a surface or screen, for example of ground glass, carried by the tractor. Such an image may be projected onto the screen from a tower in a manner analagous to the conventional method which is used for manually marking out ships plates or the like by following a profile projected from a tower.

With this embodiment, several tractors could be used, all moving simultaneously around the projected profile and the overall time required to cut the profile would then of course be reduced by a factor equal to the number of tractors used.

While in the embodiments of the invention described with reference to FIGS. 2-5 the basic control system utilises X and Y axes it will be appreciated that polar coordinates (R, $\theta$) or other coordinate systems such as (L, $\theta1$, $\theta2$) could equally well be employed if appropriate modifications apparent to one skilled in the control art are made.

In the embodiments of FIGS. 2-5 the position of the tractor is monitored by optical telescopes. These telescopes could be replaced by transducers responding to ultrasonic, laser, radar or other signals without departing from the principle of the invention.

It will be appreciated that the utility of the tractor and guidance and control system is not confined to flame cutting applications. Any operation that requires a load to be carried to, or a job to be effected at a predetermined position can be automated with advantage using the principles and equipment disclosed and claimed herein. The tractor can be manually or remotely controlled, have mains, battery or other source of motive power. In alternative embodiments, operation could be by limit switches, seqeunce control, or radio control. Light beams could be used as in the particular embodiment disclosed herein and reflected up, over and down again to avoid interruption of control in horizontal plane.

We claim:

1. A transporter having two pairs of self-laying endless tracks provided with roller elements adapted to bear on a support surface and rotatable about axes parallel to the longitudinal axis of the respective track, the tracks of each pair being perpendicular to the tracks of the other pair to provide for omnidirectional two-dimensional movement of the transporter with fixed orientation thereof.

2. A transporter as claimed in claim 1, in which the tracks are disposed in the shape of a rectangle, and in which at least one of the tracks is made up of a plurality of pivoted links of which alternate links carry brackets, each of the brackets supporting a pair of said roller elements.

3. A transporter as claimed in claim 1, having a chassis on which is mounted a boom mounted for pivotal movement about an axis which is perpendicular to the plane in which the transporter can move, in which the boom carries at least one cutting torch having a cutting axis, and in which a lamp having a straight-line filament is mounted over the torch with the filament coaxial with the torch.

4. A transporter as claimed in claim 3, further including a servocontrol system comprised of two perpendicular guides and detecting means for detecting light emitted by the lamp when energized mounted to move along said guides.

5. A transporter as claimed in claim 4, in which the detecting means includes a telescope combined with a photocell mounted on a piezoelectric scanning device.

6. A transporter as claimed in claim 5, in which the servocontrol system includes, for each pair of parallel tracks, a filter arranged to receive the output of the respective photocell, and an amplifier arranged to receive and amplify the output from the filter and to apply it to a motor connected to drive the appropriate pair of tracks.

7. A transporter as claimed in claim 1, including a system for mounting the tracks on a chassis of the transporter, said system including a track-roller supporting-bar resiliently biased to urge the lower run of track downwardly.

8. The transporter claimed in claim 7, including a further track-roller supporting-bar resiliently biased to urge the upper run of track upwardly.

9. A transporter as claimed in claim 1, including a line follower adapted to follow a stationary pattern representing the path to be followed by the transporter, and in which the line follower is connected to supply signals controlling energization of motors operatively-connected to drive the tracks.

References Cited

UNITED STATES PATENTS

| 2,189,140 | 2/1940 | Glaum. |
| 2,496,110 | 1/1950 | Thurman. |
| 2,751,259 | 6/1956 | Bonmartini _____ 305—52 X |

HARRY N. HAROIAN, *Primary Examiner.*

U.S. Cl. X.R.

305—52; 180—9.2; 266—23